UNITED STATES PATENT OFFICE.

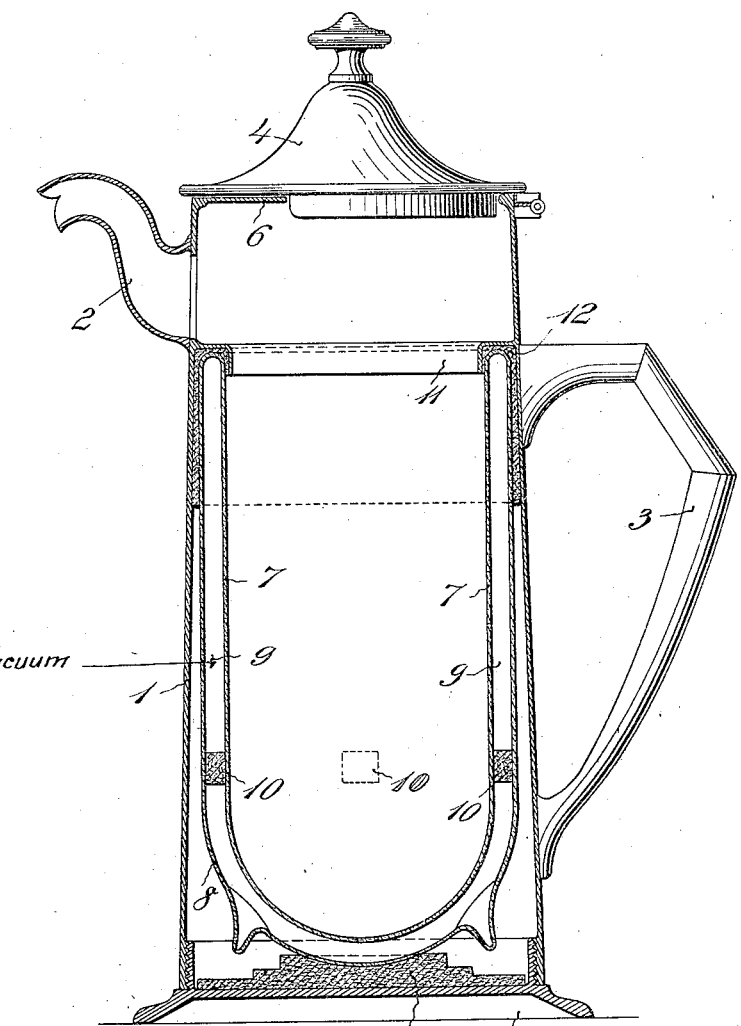

GUSTAV ROBERT PAALEN, OF BERLIN, GERMANY.

PITCHER.

No. 921,729.

Specification of Letters Patent.

Patented May 18, 1909.

Application filed November 21, 1908. Serial No. 463,809.

*To all whom it may concern:*

Be it known that I, GUSTAV ROBERT PAALEN, and resident of Berlin, W., Kaiserin Augustastrasse 79, Germany, have invented a new and useful Improvement in Pitchers, of which the following is a specification.

This invention relates to certain improvements in the construction of a pitcher whereby the liquid which it may contain is kept approximately at a predetermined temperature for a considerable time.

A practical embodiment of this invention is represented in the accompanying drawings, in which the pitcher is shown partly in vertical central section and partly in side elevation.

The pitcher comprises a body portion 1, its spout 2 and handle 3; a hinged cover 4 and a removable base 5. Across the top of the body portion 1 of the pitcher at its top is provided a lip 6 for preventing the contents of the pitcher from overflowing the top when the pitcher is tilted as in the act of pouring.

The receptacle for the liquid comprises a vacuum insulated double walled vessel of glass, porcelain or other suitable material; the inner wall 7 being connected to the outer wall 8 of the vessel only at the mouth thereof. The vacuum space between the walls is denoted by 9. These walls may be held spaced apart to reinforce the inner wall, by interposing suitable devices, such as asbestos blocks 10 between the said walls at a distance from the mouth of the vessel.

The mouth of the double walled vessel is unrestricted thus permitting the free escape of the liquid therefrom in pouring.

The base 5 in the present instance is shown as removably secured to the body portion 1 by providing a screw threaded engagement between the two.

The vacuum insulated vessel is secured within the pitcher as follows: The body portion 1 is provided on its interior with an annular flange 11 angular in cross section, forming an annular recess for receiving the unrestricted mouth of the said vessel. Some suitable material 12 is used for cementing the vessel in position, as, for instance, plaster of paris, which is inserted between the flange, the adjacent wall of the body portion and the vessel at its mouth and a distance along its outer wall 8. The bottom of the vessel is supported by interposing a pad 13 of felt or other suitable packing material between the bottom of the vessel and the removable base 5. As the base is screwed up into position, it will force the pad 13 into snug engagement with the vessel.

It will be seen that not only may the liquid within the pitcher be kept for a long time at approximately a predetermined temperature, but also that access to the interior of the double walled vessel may be readily obtained for cleansing the same, and that by removing the base, the vessel may be easily renewed when required.

What I claim is:—

1. In combination with a pitcher having a spout at its upper portion, an inwardly and downwardly turned flange on the inner periphery of said pitcher below said spout, a cylindrical vacuum double walled vessel disposed in said pitcher and having its rim seated between the downwardly turned part of said flange and said wall, and means for supporting said vessel in place.

2. In combination with a pitcher having a spout at its upper portion, an inwardly and downwardly turned flange on the inner periphery of said pitcher below said spout, a cylindrical vacuum double walled vessel disposed in said pitcher and having its rim seated between the downwardly turned part of said flange and said wall and cemented in said flange.

In testimony, that I claim the foregoing as my invention, I have signed my name in presence of two witnesses, this twenty-fourth day of October 1908.

GUSTAV ROBERT PAALEN.

Witnesses:
 HUGO REPPIN,
 HANS ISRAEL.